United States Patent
Shiraki et al.

(10) Patent No.: US 8,557,190 B2
(45) Date of Patent: Oct. 15, 2013

(54) CARBON NANOTUBE SYNTHESIS PROCESS APPARATUS

(75) Inventors: Shuichi Shiraki, Tokyo (JP); Takeji Murai, Makinohara (JP); Yuzo Nakagawa, Tokyo (JP)

(73) Assignee: Nikkiso Co., Ltd., Tokyo (JP)

( * ) Notice: Subject to any disclaimer, the term of this patent is extended or adjusted under 35 U.S.C. 154(b) by 36 days.

(21) Appl. No.: 12/863,528

(22) PCT Filed: Nov. 12, 2008

(86) PCT No.: PCT/JP2008/070590
§ 371 (c)(1), (2), (4) Date: Jul. 19, 2010

(87) PCT Pub. No.: WO2009/093370
PCT Pub. Date: Jul. 30, 2009

(65) Prior Publication Data
US 2010/0296983 A1    Nov. 25, 2010

(30) Foreign Application Priority Data

Jan. 21, 2008 (JP) .................. 2008-010397

(51) Int. Cl.
 *B01J 19/00* (2006.01)
 *B01J 8/00* (2006.01)
 *C01B 31/00* (2006.01)
 *C01B 31/02* (2006.01)
 *C09C 1/48* (2006.01)

(52) U.S. Cl.
USPC .......... 422/198; 422/129; 422/130; 422/187; 423/414; 423/415.1; 423/440; 423/445 B; 423/450; 423/451; 423/452; 423/453; 423/454; 423/455; 423/456; 423/457; 423/458; 423/459; 423/461

(58) Field of Classification Search
USPC .......... 422/129, 130, 198; 977/734, 742–753, 977/842–848; 423/414, 415.1, 440, 445 B, 423/450–459, 461
See application file for complete search history.

(56) References Cited

U.S. PATENT DOCUMENTS

| 4,106,892 A | 8/1978 | Haga et al. |
| 6,878,360 B1 | 4/2005 | Ohsaki et al. |

(Continued)

FOREIGN PATENT DOCUMENTS

| CN | 1747894 A | 3/2006 |
| CN | 1802315 A | 7/2006 |

(Continued)

OTHER PUBLICATIONS

Machine translation of JP 2006-315889 A, which was published Nov. 24, 2006.*

(Continued)

*Primary Examiner* — Prem C Singh
*Assistant Examiner* — Natasha Young
(74) *Attorney, Agent, or Firm* — McCarter & English, LLP

(57) ABSTRACT

A carbon nanotube synthesis process apparatus comprises a reaction tube in which a reaction field is formed, and a discharge pipe (32) arranged downstream of the reaction tube and discharging carbon nanotubes to the outside. A plurality of nozzles (34) are provided on the sidewall of the discharge pipe (32) in directions which are deflected with respect to the center (O) of the discharge pipe (32). When gases are discharged from the plurality of nozzles (34), a swirl flowing from the inner side surface along the inner side surface is produced in the discharge pipe (32). Adhesion of carbon nanotubes to the inner side surface of the discharge pipe (32) is prevented by the swirl flow and thus the apparatus can be operated continuously.

4 Claims, 4 Drawing Sheets

(56) References Cited

U.S. PATENT DOCUMENTS

| | | |
|---|---|---|
| 2005/0129607 A1 | 6/2005 | Takehara et al. |
| 2005/0163696 A1 | 7/2005 | Uhm et al. |
| 2007/0025906 A1 | 2/2007 | Pirard et al. |

FOREIGN PATENT DOCUMENTS

| | | | |
|---|---|---|---|
| EP | 0 028 086 A1 | | 5/1981 |
| EP | 1 642 866 A1 | | 4/2006 |
| JP | 01207419 A | * | 8/1989 |
| JP | 10-314963 A | | 12/1998 |
| JP | 11-107052 A | | 4/1999 |
| JP | 2000178835 A | * | 6/2000 |
| JP | 2001-73231 A | | 3/2001 |
| JP | 2001-115342 A | | 4/2001 |
| JP | 2002266171 A | * | 9/2002 |
| JP | 2005 008456 A | | 1/2005 |
| JP | 2005-179122 A | | 7/2005 |
| JP | 2006-198463 A | | 8/2006 |
| JP | 2006315889 A | * | 11/2006 |
| WO | WO 2006/055678 A2 | | 5/2006 |
| WO | WO 2006/064760 A1 | | 6/2006 |

OTHER PUBLICATIONS

Machine translation of JP 2000-178835 A, which was published Jun. 27, 2000.*

Machine translation of JP 2002-266171 A, which was published on Sep. 18, 2002.*

Machine translation of JP 2005-008456 A, which was included in the IDS submitted on Feb. 27, 2012 and published Jan. 13, 2005.*

International Search Report and Written Opinion for International Application No. PCT/JP2008/070590.

International Preliminary Report on Patentability for International Application No. PCT/JP2008/070590.

Supplementary European Search Report for European Application No. EP 08 87 1384, dated Dec. 9, 2011.

* cited by examiner

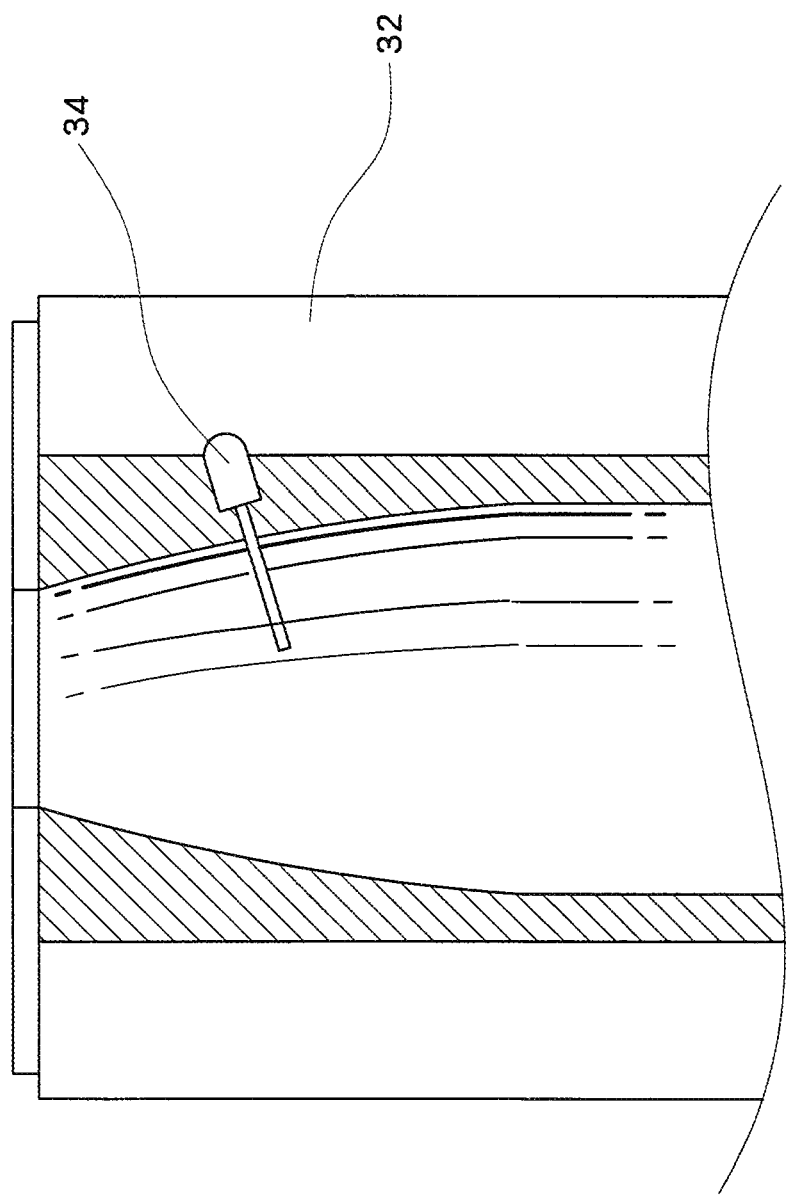

CARBON NANOTUBE SYNTHESIS PROCESS APPARATUS

This application is the U.S. National Phase of International Application No. PCT/JP2008/070590, entitled "Apparatus for Producing Carbon Nanotube" filed Nov. 12, 2008, claiming priority to Japanese Patent Application No. 2008-010397 filed Jan. 21, 2008, the disclosures each of which are hereby incorporated by reference in their entirety.

FIELD OF THE INVENTION

The present invention relates to a carbon nanotube synthesis process apparatus for producing carbon nanotubes such as carbon nanotubes and carbon fibers by using a gas-phase flow method.

BACKGROUND

Carbon nanotubes are crystalline carbon having a structure in which a thin layer of graphite crystal is rolled up to form a cylindrical shape. More specifically, carbon atoms forming carbon nanotubes form a graphene sheet having a flat or curved surface formed of six-membered rings of carbon molecules arranged in a hexagonal pattern, and the graphene sheet is rolled up to form a cylindrical carbon nanotube. In general, the diameter of carbon nanotubes is 0.4 nm to tens of nm, and the length of carbon nanotubes is normally several tens to several thousands or more times as long as the diameter thereof.

Such carbon nanotubes have a high degree of strength, excellent electrical conductivity, thermal conductivity, and lubrication property, and have therefore drawn attentions from various application aspects. Further, in order to allow carbon nanotubes to be distributed at lower costs, more efficient technologies for producing carbon nanotubes are being required.

A so-called gas-phase flow method has been known as one of technologies for producing carbon nanotubes. With this gas-phase flow method, carbon-containing materials and a catalyst metal are caused to flow along with carrier gas within a high-temperature furnace to thereby thermally decompose and synthesize materials such as carbon sources in the gas-phase, thereby producing carbon nanotubes. As this gas-phase flow method is suitable for mass production, there have been proposed a large number of improved technologies/processes for this method.

With this gas-phase flow method, there are cases in which a discharge pipe disposed downstream of a reaction tube is clogged with produced carbon nanotubes. Specifically, while carbon nanotubes synthesized in the reaction tube are supposed to flow in the downstream direction and to be finally discharged externally through the discharge pipe provided downstream of the reaction tube, there are cases in which, during this transfer process, the carbon nanotubes adhere to the inner surface of the discharge pipe. Once even a little amount of nanotubes is adhered to the inner surface of the discharge pipe, further carbon nanotubes are easily adhered to (or easily caught by) the carbon nanotubes already adhered to the inner surface, resulting in a rapid increase in the amount of carbon nanotubes accumulated in the discharge pipe. This may then finally result in clogging of the discharge pipe with the carbon nanotubes. In order to deal with this problem, conventionally, operation of the production apparatus is periodically interrupted and remove the carbon nanotubes adhered to the inner surface of the discharge pipe. However, the operations of periodical interruption of a production apparatus and removal of the carbon nanotubes as described above have caused problems including a reduction in the production efficiency of carbon nanotubes and an increase in the burden on operators.

JP 2001-73231 A and JP 2001-115342 A disclose technologies for preventing adhesion of carbon nanotubes onto the inner surface of the reaction tube. However, these technologies aim at prevention of adhesion of carbon nanotubes to a reaction tube and cannot therefore prevent adhesion to a discharge pipe. In addition, while a variety of other improved technologies have been proposed concerning the gas-phase flow method, there currently exist no technologies which can appropriately prevent carbon nanotubes from being adhered to and clogging a discharge pipe. Therefore, there has been difficult to increase the production efficiency of carbon nanotubes.

SUMMARY OF THE INVENTION

Accordingly, the present invention aims at providing a carbon nanotube synthesis process apparatus with which the production efficiency of carbon nanotubes can be increased.

In accordance with an aspect of the present invention, there is provided a carbon nanotube synthesis process apparatus for producing a carbon nanotube by using a gas-phase method, the apparatus including a reaction tube; a supply unit which supplies a carbon-containing raw material from an upstream side of the reaction tube; a heating unit which heats the reaction tube to thereby generate within the reaction tube a reaction field which thermally decomposes the carbon-containing raw material to produce a carbon nanotube; a discharge pipe disposed downstream of the reaction tube for directing the carbon nanotube produced in the reaction tube to the outside; and a swirl flow generation unit which generates a swirl flow flowing from an inner side surface of the discharge pipe along the inner side surface thereof.

In accordance with another preferable embodiment, the swirl flow generation unit includes a plurality of nozzles disposed on the inner side surface of the discharge pipe for discharging gases in a direction which is deflected from the center of the discharge pipe. Preferably, the plurality of nozzles are arranged at equal intervals in the circumferential direction of the discharge pipe. Further, the nozzles are preferably disposed near an upstream end of a low-temperature region of the discharge pipe having a temperature lower than the allowable temperature of the nozzles.

According to the present invention, a swirl flow flowing from the inner side surface of the discharge pipe along the inner side surface thereof is generated within the discharge pipe. With this swirl flow, as the carbon nanotubes are isolated from the wall surface and transferred toward the center of the discharge pipe, adhesion of the carbon nanotubes to the inner side surface and resulting clogging of the discharge pipe can be effectively prevented. Also, even if the carbon nanotubes are adhered to the inner side surface, the carbon nanotubes are removed by the swirl flow. Consequently, continuous operation of the carbon nanotube synthesis process apparatus can be achieved so that the production efficiency thereof can be increased.

BRIEF DESCRIPTION OF THE DRAWINGS

These and other objects of the invention will be explained in the description below, in connection with the accompanying drawings, in which:

FIG. 4 is a cross sectional view taken along line B-B in FIG. 2.

DETAILED DESCRIPTION OF EMBODIMENTS OF THE INVENTION

Figure 1:
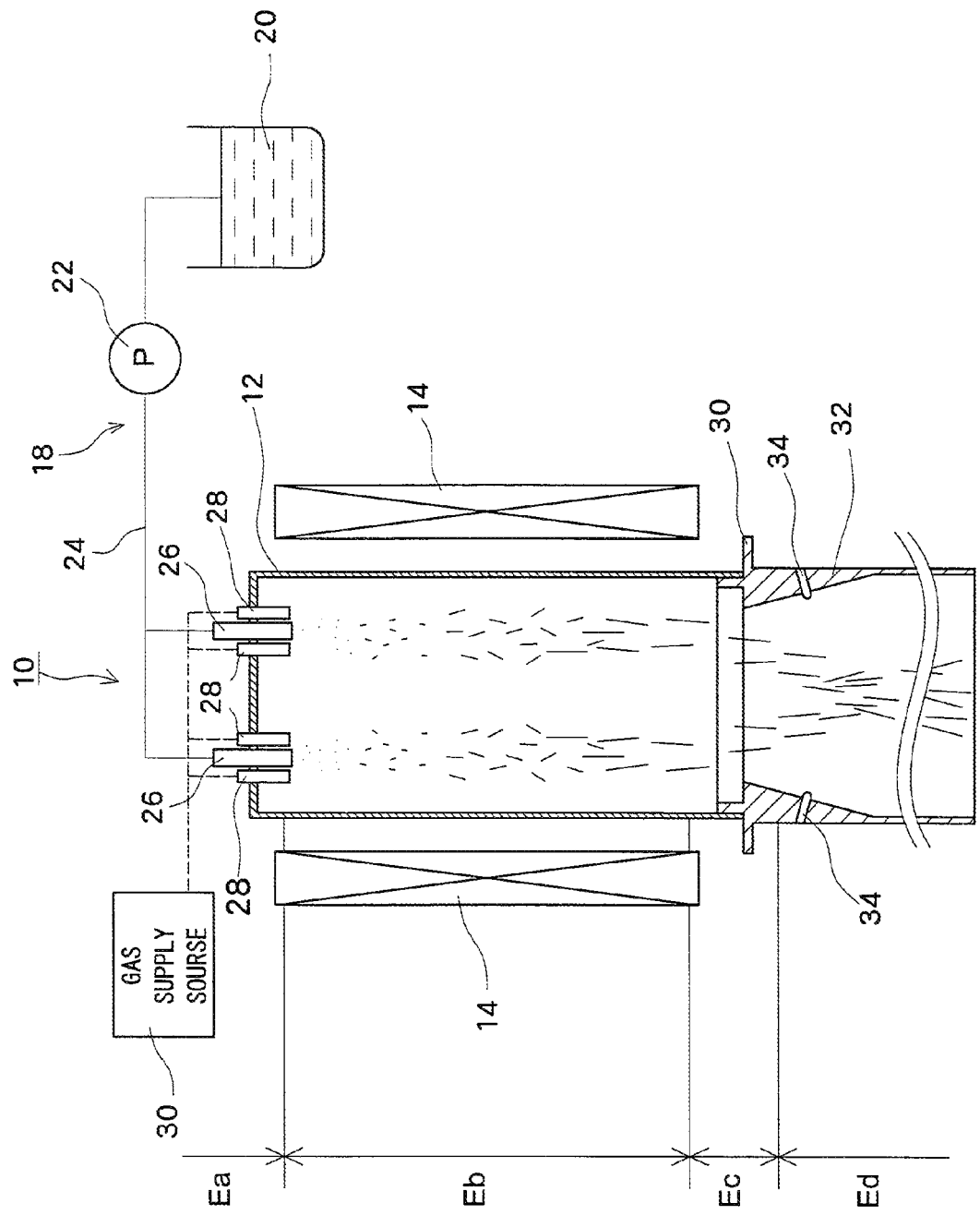
FIG. 1 is a view schematically illustrating a structure of a carbon nanotube synthesis process apparatus according to an embodiment of the present invention.

A preferred embodiment of the present invention will be described with reference to the drawings. FIG. 1 is a view schematically illustrating a structure of a carbon nanotube synthesis process apparatus 10 according to an embodiment of the present invention. The carbon nanotube synthesis process apparatus is an apparatus for producing carbon nanotubes by a gas-phase flow method, and includes a reaction tube 12, a heating device 14 for heating the reaction tube 12, a raw material supply mechanism 18 for supplying a raw material liquid to the reaction tube 12, a discharge pipe 32 for guiding the carbon nanotubes produced in the reaction tube 12 to a collection tank (not shown), and so on.

The reaction tube 12 is a tubular member which is heated by the heating device 14 which will be described below to generate therein a reaction field which enables synthesis reaction of carbon nanotubes. According to the present embodiment, a so-called vertical downward flow type reaction tube 12, which is designed such that the synthesis reaction of the carbon nanotubes progresses from the upper portion toward the lower portion of the reaction tube 12, is used. However, a vertical upward flow type reaction tube in which the synthesis reaction progresses from the lower portion toward the upper portion, and a lateral type reaction tube in which the synthesis reaction progresses in the lateral direction may also be used as long as the stable reaction field can be provided. Further, while it is desirable for the reaction tube 12 to be of a substantially cylinder shape, the reaction tube 12 may be of a rectangular column shape as long as the stable reaction field can be provided.

The heating device 14 is provided around the outer peripheral surface of the reaction tube 12. The heating device 14 is formed of an electric furnace, for example, and is designed to heat the interior of the reaction tube 12 to a temperature at which carbon nanotubes can be synthesized (hereinafter referred to as a "synthesis temperature").

The heating device 14 is disposed so that the heating device 14 can heat the interior of the reaction tube 12 as uniformly as possible. However, it is normal for, at edge portions of the reaction tube 12, the area of heat loss to be larger than that in the center portion of the reaction tube 12, and the temperature thereof tends to be low. In other words, in the interior of the reaction tube 12, the temperature distribution is generated in which the temperatures are lowered towards both ends of the reaction tube 12. Although it is not possible to clearly define the boundaries in this temperature distribution, a first middle temperature region Ea below the synthesis temperature is formed near the upstream edge of the reaction tube 12 and a second middle temperature region Ec below the synthesis temperature is formed near the downstream edge of the reaction tube 12. Further, in the center portion of the reaction tube 12, i.e. between the first middle temperature region Ea and the second middle temperature region Ec, a reaction region Eb in which the temperature reaches the synthesis temperature at which carbon nanotubes can be synthesized is formed. Here, while in the present embodiment the heating device 14 is provided only around the outer periphery of the reaction tube 12, the heating device 14 may additionally be provided in the interior of the reaction tube 12 in accordance with the inner diameter of the reaction tube 12 and the performances of each heating device 14.

A raw material liquid is supplied to the reaction tube 12 by the raw material supply mechanism 18. The raw material supply mechanism 18 includes a raw material tank 20, a supply nozzle 26, a raw material supply line 24, a pump 22, and so on. The raw material tank 20 is a container storing a raw material liquid. The raw material liquid is a carbon-containing liquid or a liquid in which an organic metal catalyst, inverse micelle particles containing an organic metal catalyst, a catalyst auxiliary, and so on are mixed. The raw material liquid is delivered through the raw material supply line 24 to a plurality of supply nozzles 26. Delivery of the raw material liquid is performed by the pump 22 whose driving is controlled by a control section (not shown).

The supply nozzle 26 is a nozzle which atomizes and supplies the raw material liquid, that has been delivered from the raw material tank 20, to the reaction tube 12. The supply nozzle 26 is disposed at the upstream edge of the reaction tube 12 such that the leading end thereof extends from the upstream edge surface of the reaction tube 12 into the interior of the reaction tube 12 so as to reach the reaction region Eb. While FIG. 1 illustrates an example in which two supply nozzles 26 are provided, the number of the supply nozzles 26 is not particularly limited and may be one or three or more.

When the atomized raw material liquid supplied from the supply nozzle 26 is supplied to the reaction tube 12 having a high temperature, a carbon source, an organic metal catalyst, and a catalyst auxiliary contained in the raw material liquid are evaporated. Then, due to thermal decomposition of the organic metal catalyst, catalyst fine particles are produced. When the carbon sources come in contact with the catalyst fine particles thus produced, a carbon hexagonal plane is formed on the surface of the catalyst fine particles to thereby form a cylindrical graphene sheet. Further, when this graphene sheet gradually grows in the longitudinal direction in the process in which the catalyst fine particles descend within the reaction tube 12, carbon nanotubes are produced.

An introduction tube 28 for carrier gas is provided around the supply nozzle 26. The introduction tube 28 is connected to a gas supply source through the gas supply line. The carrier gas does not affect the synthesis reaction of carbon nanotubes and transfers the raw material and the carbon nanotube being produced toward the downstream side.

The supply method of the raw material and the carrier gas described above is only an example and may be modified as desired as long as carbon nanotubes can be produced by a gas-phase flow method in which a synthesis reaction of the raw material is caused in the gas-phase. For example, the raw material may be supplied in a gas state, rather than a liquid state (the raw material liquid). Also, the introduction tube 28 may be provided not only around the supply nozzle 26 but also near the inner peripheral edge of the reaction tube 12 so that the carrier gas can flow from the introduction tube 28 along the inner side surface of reaction tube 12. With this structure, adhesion of the carbon nanotubes onto the inner side surface of the reaction tube 12 can be prevented.

A discharge pipe 32 is connected with the downstream edge of the reaction tube 12. The discharge pipe 32 is a tubular body which externally guides the carbon nanotubes produced in the reaction tube 12 and is coupled to the downstream edge of the reaction tube 12 via a housing 30. A collection tank is provided under the discharge pipe 32 to collect the carbon nanotubes which are produced.

Conventionally, clogging of the discharge pipe 32 with carbon nanotubes tends to occur. More specifically, while the carbon nanotubes flowing to the discharge pipe 32 should pass through the discharge pipe 32 and be discharged out to the collection tank, some carbon nanotubes adhere to the inner surface side of the discharge pipe 32 and stay thereon. When there are any carbon nanotubes adhered to the inner side surface of the discharge pipe 32, further carbon nanotubes are easily adhered to these carbon nanotubes. Still further carbon nanotubes in turn adhere to the carbon nanotubes which are already adhered. Finally, a large amount of carbon nanotubes engage with each other and stay on the inner side surface of the discharge pipe 32, which may result in clogging of the interior of the discharge pipe 32 with the carbon nanotubes.

Such clogging caused by carbon nanotubes may have similarly occurred in the reaction tube 12. Concerning prevention of clogging of the reaction tube 12, however, a large number of improved technologies have been conventionally proposed (for example, JP 2001-73231 A and JP 20011-115342 A) and thus clogging of the reaction tube 12 can be prevented to a certain degree by using these technologies.

On the other hand, no effective improved technologies have conventionally been proposed concerning clogging of the discharge pipe 32. Further, as is clear from FIG. 1, the discharge pipe 32 is not heated by the heating device 14. Empirical data shows that, when comparing high temperature portions and low temperature portions, carbon nanotubes are likely to adhere to low temperature portions. In other words, the discharge pipe 32 is more likely to be clogged with carbon nanotubes than the reaction tube 12. It is a matter of fact that such clogging of the discharge pipe 32, which inhibits discharge of the carbon nanotubes to the collection tank, is not desirable. In order to deal with this problem, it was conventionally necessary to periodically interrupt operation of the carbon nanotube synthesis process apparatus 10 to remove the carbon nanotubes adhered to the inner side surface of the discharge pipe 32 so as to prevent clogging of the discharge pipe 32. These periodical operations for interrupting the production apparatus 10 and for removing carbon nanotubes cause a reduction in the production efficiency of the carbon nanotubes and an increase in the burden on operators.

Therefore, according to the present embodiment, in order to prevent clogging of the discharge pipe 32 with carbon nanotubes, the discharge pipe 32 is configured to have a special structure, as will be described in detail below.

Figure 2:
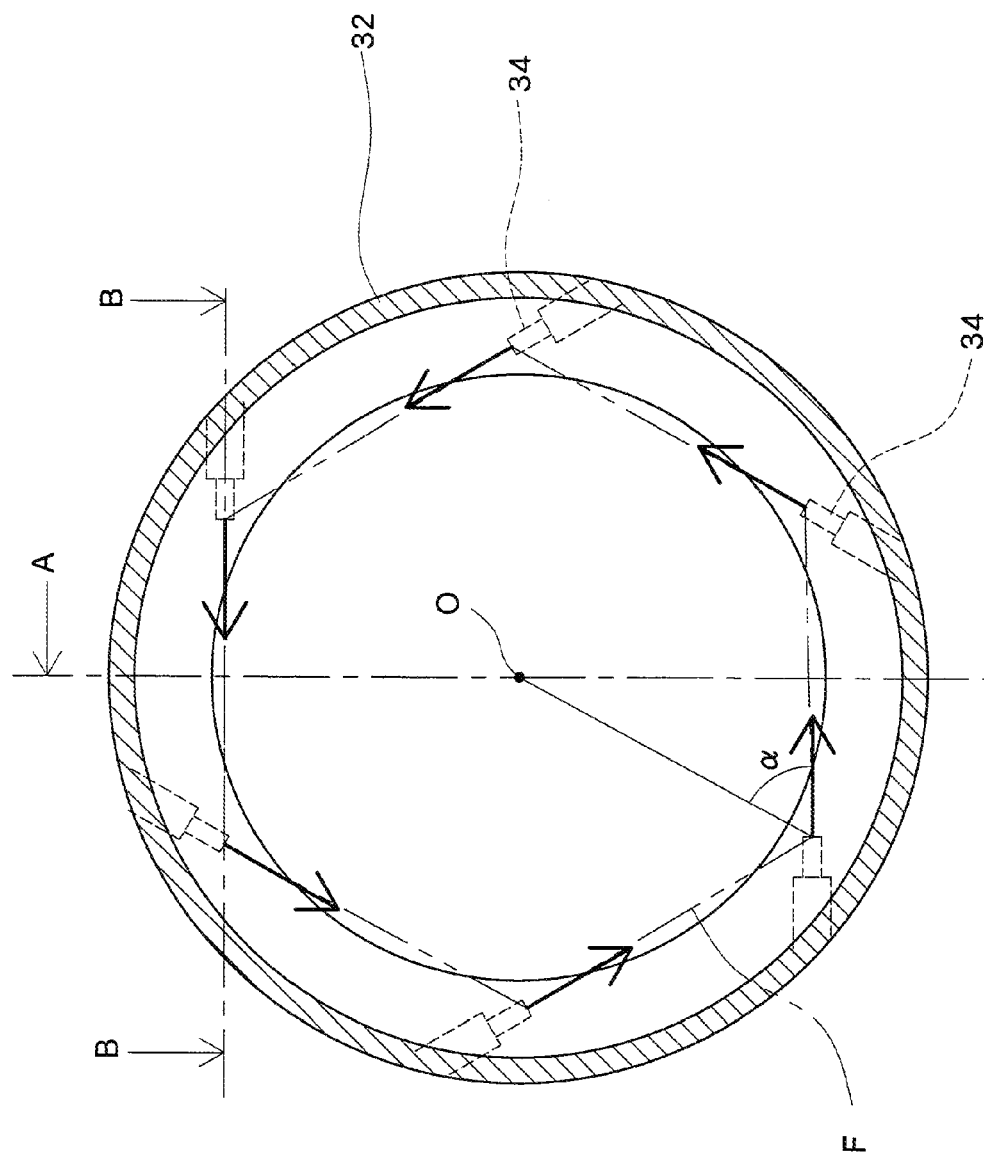
FIG. 2 is a schematic cross sectional view of a discharge pipe.
Figure 3:
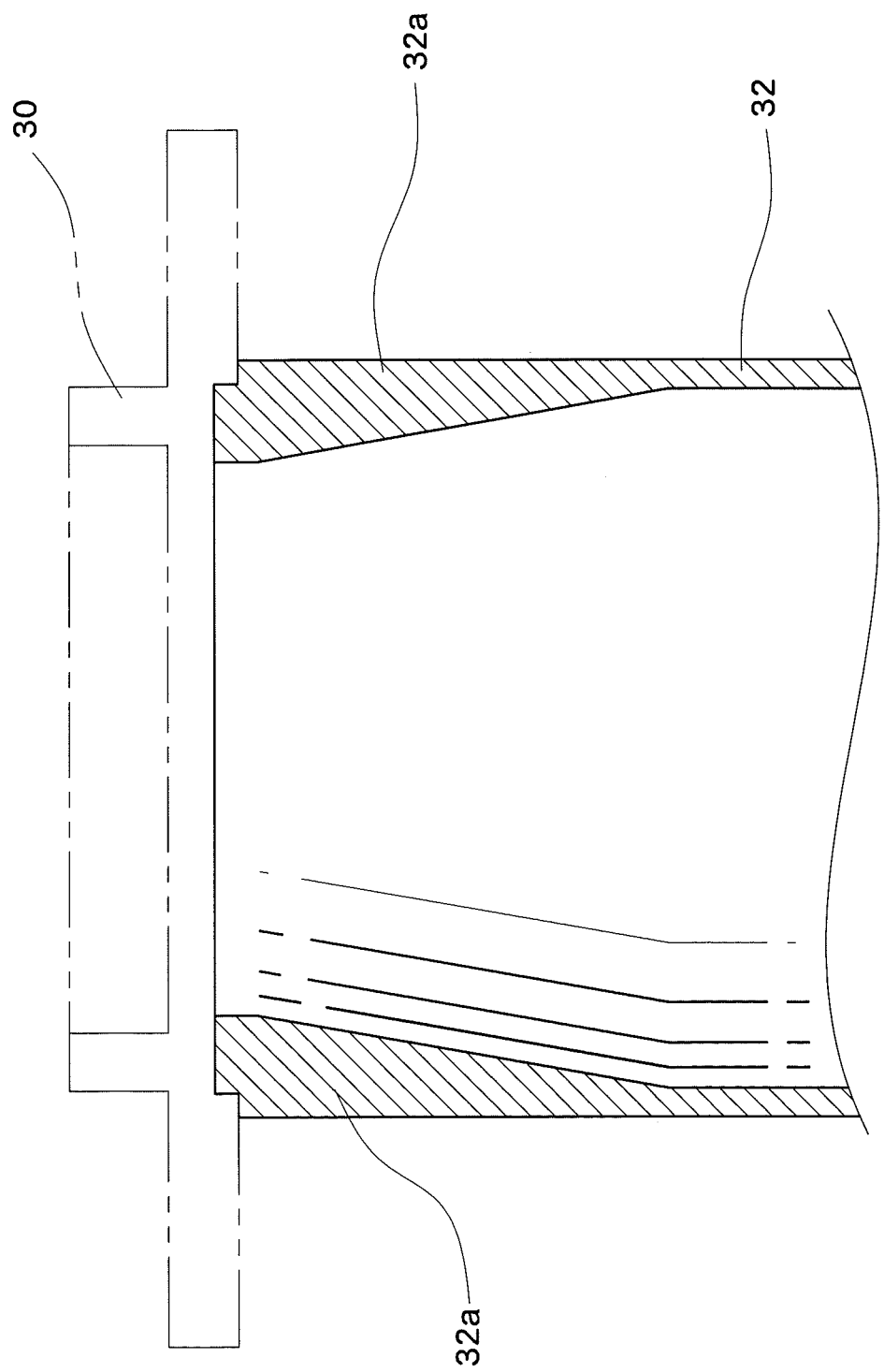
FIG. 3 is a cross sectional view taken along line A-A in FIG. 2.

FIG. 2 is a schematic cross sectional view of the discharge pipe 32 (except for the housing 30 which connects the discharge pipe 32 to the reaction tube 12). Further, FIG. 3 is a cross sectional view taken along line A-A of FIG. 2 and FIG. 4 is a cross sectional view taken along line B-B of FIG. 2.

The discharge pipe 32 according to the present embodiment is a tubular body coupled to the lower end of the reaction tube 12 via the housing 30 (see FIG. 3), and has an inner diameter which is substantially the same as that of the reaction tube 12. However, portions of the discharge pipe 32 near the upstream edge (i.e. the edge portions on the side of the reaction tube 12) are formed to have a slightly tapered portion 32a in which the inner diameter thereof is gradually reduced toward the upstream edge, as illustrated in FIG. 3. Stated in a different manner, the discharge pipe 32 is formed to have a slightly thicker wall thickness near the upstream edge than the downstream side. Such a structure in which the wall thickness near the upstream edge is thick facilitates stable support of the nozzle 34 as will be described below. However, as long as stable support for the nozzle 34 can be secured, it is not always necessary to provide the thicker wall portion (taper portion), and a straight tubular body having a uniform wall thickness may be used or a seat by means of a boss and so on may be provided.

A plurality of (six in the illustrated example) nozzles 34 are provided in a fixed manner on the side surface of the discharge pipe 32. These plural nozzles 34 function as a swirl flow generation unit which generates swirl flow within the discharge pipe 32. Each nozzle 34 is connected to a gas supply source (not shown) and emits gas into the discharge pipe 32 in accordance with an instruction from the controller. The type of this gas is not particularly limited as long as the gas does not deteriorate or alter the quality of the carbon nanotubes after synthesis. Accordingly, gas which is the same type as the carrier gas may be used, or nitrogen may be used. Further, the flow velocity (flow rate) of the gas emitted from each nozzle 34 should have a magnitude at which the carbon nanotubes can be transferred without being adhered.

As illustrated in FIG. 2, this nozzle 34 is fixed to the side wall of the discharge pipe 32 in a direction which is deflected with respect to the center O of the discharge pipe 32. In this case, the orientation directions of all the nozzles 34 are the same. Also, the plural nozzles 34 are arranged at equal intervals in the circumferential direction. Here, while the deflection angle α of each nozzle 34 with respect to the diameter can be adjusted as appropriate depending on the flow velocity of the gas to be emitted and the number of nozzles 34, the nozzles 34 may be disposed, for example, in the directions which are substantially identical with sides of a regular polygon having apexes at positions where tips of the plurality of nozzles are located. More specifically, in the example illustrated in FIG. 2, the nozzles 34 may be disposed such that each of sides of a regular hexagon, having apexes each corresponding to the tip of each nozzle 34, substantially corresponds to the orientation direction of each nozzle 34.

Further, as illustrated in FIG. 4, each nozzle 34 is fixed while being directed diagonally downward. With this arrangement, gas which is directed diagonally downward is emitted from each nozzle 34, and carbon nanotubes are actively transferred to the downstream side by the gas. Here, the inclination angle of each nozzle can be adjusted as appropriate depending on the number of nozzles. While, when six nozzles are disposed as in the present embodiment, the inclination angle is preferably about 10 degrees, the inclination angle may be increased or decreased within a range of about ±10 degrees.

Here, in order to reduce the amount of carbon nanotubes adhered to the inner side surface of the discharge pipe 32, it is desirable to provide each nozzle 34 at a position as close to the upstream edge of the discharge pipe 32 as possible. However, the upstream edge of the discharge pipe 32, which is connected with the reaction tube 12 which is kept at a high temperature, is likely to have a relatively high temperature. More specifically, as illustrated in FIG. 1, in the section near the upstream edge of the discharge pipe 32, the second middle temperature region Ec having substantially the same temperature as that in the section near the downstream edge of the reaction tube 12 is formed. While this second middle temperature region Ec does not have a temperature which is as high as the temperature of the reaction region Eb in which synthesis reaction of carbon nanotubes is performed, the second middle temperature region Ec can have a considerably high temperature state (several hundred degrees). There is therefore a possibility that the nozzle 34 will be damaged by heat in this second middle temperature region Ec. Accordingly, the nozzle 34 is provided near the upstream edge of the low temperature region Ed having a temperature which is equal to or lower than the allowable temperature of the nozzle 34.

When the gas is emitted from a plurality of nozzles 34 disposed as described above, a swirl flow in a vortex or spiral shape is formed within the discharge pipe 32, which flows along the inner side surface towards the downstream side (see FIG. 2). With this swirl flow, the carbon nanotubes passing through the discharge pipe 32 are isolated from the wall surface and converged near the center of the discharge pipe 32. In other words, the carbon nanotubes are prevented from moving to the inner side surface of the discharge pipe 32, so that adhesion of the carbon nanotubes to the inner side surface is prevented. As a result, the need for periodical interrupting operation of the production device 10 and for removing the carbon nanotubes adhered to the inner surface side can be eliminated, so that long-time continuous operation of the production device 10 can be achieved. Consequently, the production efficiency of carbon nanotubes can be significantly increased.

As described above, according to the present embodiment, it is possible to effectively prevent adhesion of carbon nanotubes to the inner side surface of the discharge pipe 32, so that the production efficiency of the carbon nanotubes can be significantly increased. It should be noted that while the discharge pipe 32 and the reaction tube 12 are separate members in the above example, these members may be formed integrally. Further, while in the above example all of the plurality of nozzles 34 are disposed at the same height, the nozzles 34 may be disposed at different heights.

What is claimed is:

1. A carbon nanotube synthesis process apparatus for producing a carbon nanotube by using a gas-phase method, the apparatus comprising:
    a reaction tube;
    a supply unit which supplies a carbon-containing raw material from an upstream side of the reaction tube;
    a heating unit which heats the reaction tube to thereby generate within the reaction tube a reaction field which thermally decomposes the carbon-containing material to produce a carbon nanotube;
    a discharge pipe located directly downstream of the reaction tube and directly coupled to an edge portion on a downstream side of the reaction tube for directing the carbon nanotube produced within the reaction tube to outside; and
    a swirl flow generation unit comprising a plurality of nozzles arranged at the inner side surface of the discharge pipe and configured to emit gas in a direction that is deflected from the center of the discharge pipe, and which generates a swirl flow that flows from an inner side surface of the discharge pipe along the inner side surface thereof and that isolates the carbon nanotubes passing through the discharge pipe from the inner side surface of the discharge pipe, prevents the carbon nanotubes from moving to the inner side surface of the discharge pipe, and converges the carbon nanotubes near a center of the discharge pipe;
    wherein the discharge pipe is at least one of (i) oriented in substantially the same direction as the reaction tube; (ii) substantially aligned with the reaction tube; and (iii) oriented such that the carbon nanotubes flow through the discharge pipe in substantially the same direction as they flow through or out of the reaction tube.

2. The carbon nanotube synthesis process apparatus according to claim 1, wherein the swirl flow generation unit includes a plurality of nozzles disposed on an inner side surface of the discharge pipe for emitting gas in a direction which is deflected from the center of the discharge pipe.

3. The carbon nanotube synthesis process apparatus according to claim 2, wherein the plurality of nozzles are arranged at equal intervals in a circumferential direction of the discharge pipe.

4. The carbon nanotube synthesis process apparatus according to claim 2, wherein the nozzles are disposed near an upstream edge of a low-temperature region of the discharge pipe having a temperature which is lower than an allowable temperature of the nozzles.

* * * * *